(12) United States Patent
Kennedy

(10) Patent No.: US 7,604,020 B2
(45) Date of Patent: Oct. 20, 2009

(54) BREATHER ASSEMBLY

(75) Inventor: Donald Michael Kennedy, Arden, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 369 days.

(21) Appl. No.: 11/226,012

(22) Filed: Sep. 14, 2005

(65) Prior Publication Data

US 2007/0056400 A1    Mar. 15, 2007

(51) Int. Cl.
*F16K 24/04* (2006.01)

(52) U.S. Cl. .................... 137/197; 138/46; 74/606 R; 55/385.4

(58) Field of Classification Search .......... 137/171, 137/197, 198, 493, 540, 543.17, 543.19, 137/583; 138/46; 251/120, 121; 74/606 R, 74/607; 55/385.4, 417
See application file for complete search history.

(56) References Cited

U.S. PATENT DOCUMENTS

| | | | | |
|---|---|---|---|---|
| 442,529 A | * | 12/1890 | Merrill | 137/197 |
| 2,314,963 A | * | 3/1943 | Zelnis | 137/197 |
| 2,781,778 A | * | 2/1957 | Lisciani | 137/540 |
| 2,880,744 A | * | 4/1959 | Daley, Jr. | 137/197 |
| 3,228,419 A | * | 1/1966 | Smith et al. | 137/540 |
| 3,422,956 A | * | 1/1969 | Hadden | 210/106 |
| 4,351,203 A | * | 9/1982 | Fukunaga | 74/606 R |
| 4,506,562 A | * | 3/1985 | Yamaura et al. | 74/606 R |
| 4,595,118 A | * | 6/1986 | Azuma et al. | 220/203.27 |
| 4,794,942 A | * | 1/1989 | Yasuda et al. | 137/197 |
| 5,062,447 A | * | 11/1991 | Davison et al. | 137/493 |
| 5,724,864 A | * | 3/1998 | Rodgers et al. | 74/606 R |
| 6,015,444 A | * | 1/2000 | Craft et al. | 74/606 R |
| 6,058,969 A | * | 5/2000 | Bollwahn et al. | 137/583 |
| 6,447,565 B1 | * | 9/2002 | Raszkowski et al. | 55/385.4 |
| 7,025,175 B1 | * | 4/2006 | Pate | 184/6.23 |
| 7,048,140 B1 | * | 5/2006 | Caldwell | 220/371 |
| 7,517,392 B2 | * | 4/2009 | Neff et al. | 137/197 |

FOREIGN PATENT DOCUMENTS

| | | | |
|---|---|---|---|
| JP | 07017204 A | * | 1/1995 |
| JP | 09310773 A | * | 12/1997 |

* cited by examiner

*Primary Examiner*—John Rivell
*Assistant Examiner*—Craig Price
(74) *Attorney, Agent, or Firm*—Carlson, Gaskey & Olds

(57) ABSTRACT

A breather for a driveline component such as an axle, for example, includes a rigid body portion attached to an axle housing, an extension portion attached to the rigid body portion and extending into a housing cavity, and a conical spring supported by the extension portion. The rigid body portion has an internal bore that extends from a first body end to a second body end with the first body end extending outwardly from the axle housing and the second body end being fixed to the axle housing. The extension portion has a non-uniform cross-sectional area, and includes an extension bore with a large internal diameter. The conical spring is received within the extension bore and cooperates with the extension to prevent lubricating fluid from exiting the breather while still allowing air to vent through the breather as needed.

19 Claims, 1 Drawing Sheet

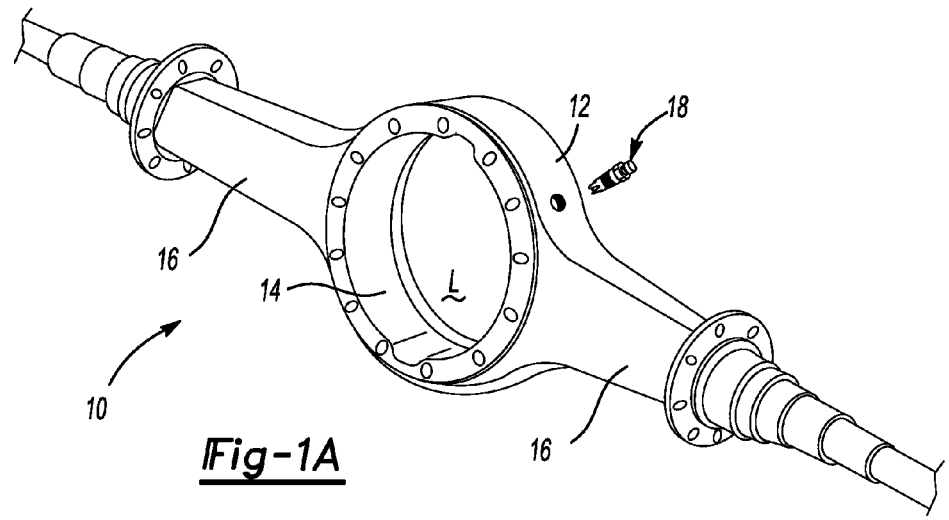
Fig-1A
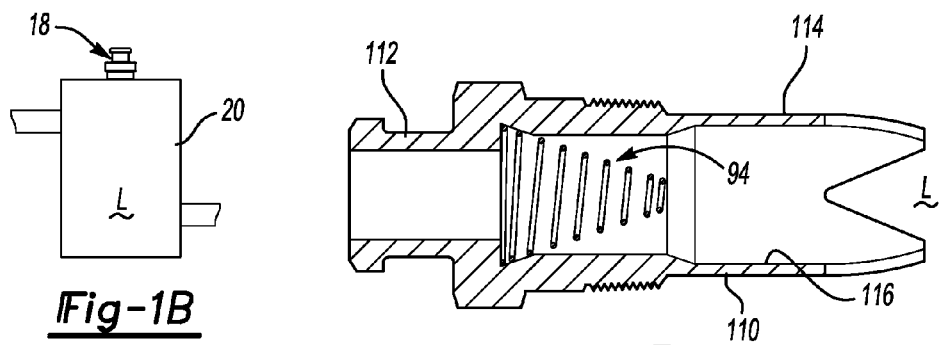
Fig-1B
Fig-3
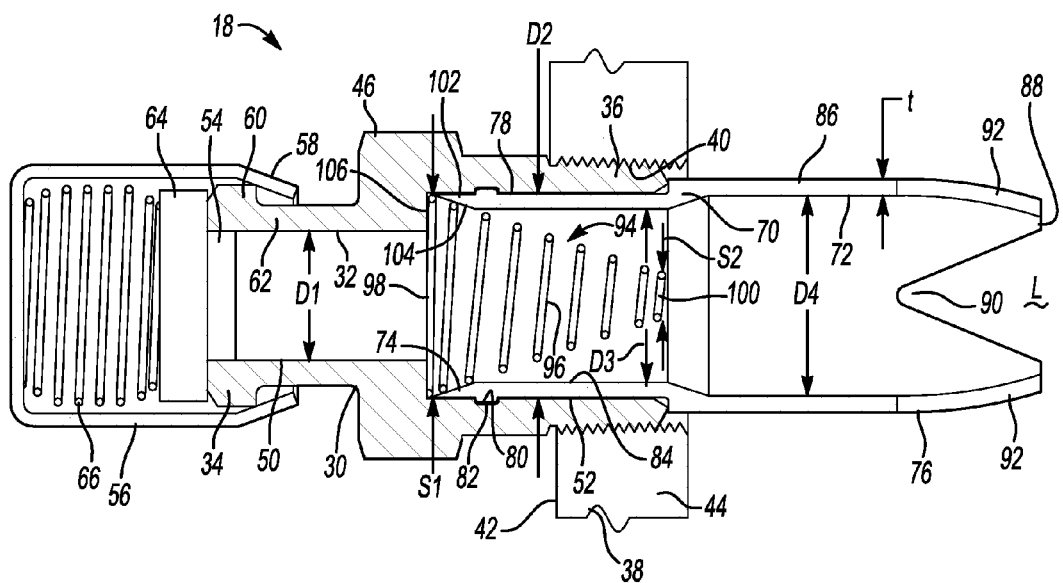
Fig-2

BREATHER ASSEMBLY

TECHNICAL FIELD

The subject invention is directed to a breather for a driveline component that utilizes a body portion and a resilient member that cooperate to block lubricating fluid from exiting the breather.

BACKGROUND OF THE INVENTION

Breathers are used to release air pressure, which builds up during operation, from within a housing for driveline components such as axles, transfer cases, and transmissions. One problem with current breathers is that the breathers provide a leakage path for lubricating fluid contained within the housing. This leaking can be generated by several different operational modes, such as pumping, splashing, and spattering caused by internal driveline components enclosed within the housing. Air flow rate, fluid temperature, changes in operational speed, etc. can also affect leakage amounts.

Several different solutions have been proposed to address this problem but have had limited success. One solution provides a breather body that is threaded into the housing with one end extending outwardly from the housing and an opposite end being flush with an internal wall of the housing. The breather body has an internal bore that includes a pair of baffles offset from each other to block lubricating fluid from exiting the bore. During operation a thick film of fluid bridges an opening to the internal bore at the internal wall of the housing. This thick film of fluid causes fluid to collect at the breather location, which is undesirable. The baffles prevent some but not all of the lubricating fluid from exiting the breather.

Mesh screens have also been used in place of baffles to prevent fluid from exiting the breather. These mesh screens have a tendency to clog and do not allow fluid to drain back into the housing.

Another solution provides a breather body with a tube that extends into the housing cavity. The tube has the same problems identified above. A thick film of fluid bridges an opening at an internal end of the tube, which results in fluid being drawn to the breather. Further, the tube does not prevent fluid that is splashed or splattered in a direction toward the tube from exiting the breather.

Thus, there is a need for a breather that can prevent lubricating fluid from exiting the breather under harsh operating conditions while still allowing air to vent as needed.

SUMMARY OF THE INVENTION

A breather for a driveline component includes a rigid body portion attached to a housing and a resilient member supported by the body portion. The body portion and the resilient member cooperate to prevent lubricating fluid from exiting the breather while still allowing air to vent from the driveline component through the breather as needed.

In one disclosed embodiment, the breather includes an extension portion attached to the rigid body portion and extending into a housing cavity, the extension portion has a non-uniform cross-sectional area and includes an extension bore that receives the resilient member. The rigid body portion has an internal bore that extends from a first body end to a second body end with the first body end extending outwardly from the housing and the second body end being fixed to the housing. The extension bore extends through the extension portion from a first extension end to a second extension end. The first extension end is received within the internal bore and is fixed to the second body end. The second extension end extends inwardly into the housing cavity.

The resilient member comprises a conical spring that has a first spring end defining a first spring diameter and a second spring end defining a second spring diameter that is less than the first spring diameter. The first spring end is seated between the body and the extension portion and the second spring end is unsupported within the extension bore.

In one example configuration, the extension member is made from a rigid material and includes a plurality of removed areas and a plurality of slats at the second extension end. Each removed area is separated from an adjacent removed area by one of the plurality of slats to define a crowned tip.

The subject invention provides a unique breather for driveline components such as axles, transfer cases, transmissions, etc., which prevents lubrication leakage even under severe operating conditions while still allowing air to be vented as needed. These and other features of the present invention can be best understood from the following specification and drawings, the following of which is a brief description.

BRIEF DESCRIPTION OF THE DRAWINGS

FIG. 1A is a view of an axle assembly with a breather incorporating the subject invention.

FIG. 1B is a schematic view of a driveline component with a breather incorporating the subject invention.

FIG. 2 is a cross-sectional view of one embodiment of the breather of FIGS. 1A and 1B.

FIG. 3 is a schematic view of an alternate embodiment of a breather incorporating the subject invention.

DETAILED DESCRIPTION OF THE PREFERRED EMBODIMENT

FIG. 1A shows an axle 10 having a housing 12 with a central carrier portion 14 and a pair of housing legs 16. A breather 18 is installed on the axle housing 12 at the central carrier portion 14. The central carrier portion 14 is a typical location for the breather 18 to avoid interference with mounting of suspension components (not shown) on the housing legs 16. However, locating the breather 18 at the central carrier portion 14 subjects the breather 18 to high levels of lubricating fluid. Internal carrier components such as a pinion gear, ring gear, and differential gear assembly (not shown) can splash, splatter, or pump lubricating fluid in a direction toward the breather 18. With traditional breather configurations, the splatter, splash, and pump modes of operation can cause fluid lubricant to leak outwardly of the breather 18.

The subject invention provides the breather 18 within a unique configuration that prevents lubricating fluid L from exiting the breather 18 even under the harshest operating conditions. While the breather 18 is beneficial for axles 10, it should be understood that the subject breather 18 could also be used on other driveline components 20 as shown in FIG. 1B. These other driveline components 20 could comprise transmissions, transfer cases, drop boxes, independent wheel end drive units, etc.

A preferred embodiment of the breather 18 is shown in greater detail in FIG. 2. The breather 18 includes a body 30 having an internal bore 32 extending from a first body end 34 to a second body end 36. The breather 18 is attached to a housing wall 38 having a breather bore 40 that receives the second body end 36. The first body end 34 extends outwardly from an external surface 42 of the housing wall 38 and the second body end 36 is fixed to the housing wall 38 at the breather bore 40. The second body end 36 is recesses within the breather bore 40 as shown, however, the second body end 36 could also be flush with or extend just beyond an inner surface 44 of the housing wall 38.

The second body end 36 preferably has a threaded outer surface that is threadably engaged within the breather bore 40. The body 30 includes a flange portion 46 that is spaced apart from the external surface 42 of the housing wall 38.

The internal bore 32 has a first portion 50 defined by a first diameter D1 and a second portion 52 defined by a second diameter D2. The first portion 50 extends from within the flange portion 46, which is located between the first 50 and second 52 portions, to an opening 54 at the first body end 34. The second portion 52 extends from the flange portion 46 to the second body end 36.

A cap 56 covers the opening 54 at the first body end 34. The cap 56 is cup-shaped and is crimped at 58 around lip portion 60 of the first body end 34 to engage a neck portion 62. The lip portion 60 has a greater diameter than the neck portion 62 but a smaller diameter than the flange portion 46.

The cap 56 encloses a disc member 64 and a spring 66. The spring 66 biases the disc member 64 against the opening 54. This prevents dirt, debris, water, etc. from entering the internal bore 32. When air pressure builds up within the housing 12, the pressure overcomes the spring force exerted by spring 66 to move the disc member 64 away from the opening 54 to allow air to be vented or released through the internal bore 32 to atmosphere. The configuration of the spring 66 and associated spring force can be varied to meet venting needs associated with different applications.

Preferably, the disc member 64 is made from a felt material, however, other materials such as Viton® for example, could also be used. One concern with breather operation is vacuum relief on cool-down. Felt material is preferred because it allows pressure to equalize to zero gage pressure.

The breather 18 also includes an extension 70 that is received within the internal bore 32 at the second body end 36. The extension 70 includes an extension bore 72 that extends from a first extension end 74 to a second extension end 76. The first extension end 74 includes an outer surface 78 with a lip portion 80. The lip portion 80 is preferably received within a groove 82 formed within the second portion 52 of the internal bore 32 in a snap-fit. While a snap fit attachment is preferred, other attachment methods such as press-fitting, for example, could also be used.

The extension bore 72 includes a first portion 84 defined by a diameter D3 and a second portion 86 defined by a diameter D4, which is greater than diameter D3. The first portion 84 is received within the internal bore 32 and the second portion 86 extends inwardly beyond the inner surface 44 of the housing wall 38. The extension 70 has a wall thickness t that is defined at the location of the diameter D4 of the second portion 86. The diameter D4 of the second portion 86 is preferably made as large as possible, and the diameter D4 plus two times the wall thickness t is approximately equal to a minor thread diameter of a threaded portion of the second body end 36. The wall thickness t is made as small as possible. This allows the second portion 86 to have as great an internal diameter as possible while still allowing external assembly through the breather bore 40. The extension 70 is pre-installed within the body 30 to form the breather 18, which is then inserted through the breather bore 40 in the housing wall 38.

The second extension end 76 extends to a distal tip 88 that has a crowned configuration. The crowned configuration comprises a plurality of removed areas 90 (only one is shown in FIG. 2) and a plurality of slats 92 that are orientated in an alternating pattern. Each slat 92 is separated from an adjacent slat 92 by a removed area 90. This alternating pattern preferably extends circumferentially about the distal tip 88. Each slat 92 preferably tapers from a pointed end to a wider base portion as shown, however, other slat configurations could also be used.

A resilient member, shown generally at 94, is received within the extension bore 72. The resilient member 94 preferably comprises a conical spring 96 having a first spring end 98 defined by a first spring diameter S1 and a second spring end 100 defined by a second spring diameter S2 that is less than the first spring diameter S1. The extension bore 72 includes a third portion 102 that tapers to an increased diameter relative to the diameter D3 to form an extension spring seat 104. The body 30 includes a ledge portion that forms a body spring seat 106. The first spring end 98 is held between the extension 70 and body 30 at the spring seats 104, 106 such that the conical spring 96 cannot fall out of the extension 70.

The second spring end 100 is unsupported within the extension bore 72. The conical spring 96 forms a discontinuous surface with spring coils catching splash particles to prevent the particles from reaching the disc member 64. The discontinuous surface prevents capillary action and reduces oil collection at the extension 70.

In this configuration, the body 30 is preferably made from a steel material and the extension 70 is preferably made from a plastic material, however, other materials could also be utilized to form the body 30 and extension 70. By forming the body 30 from steel, temperature variations have less effect on the breather 18.

Also, instead of being separately formed as shown in FIG. 2, the body 30 and the extension 70 could be formed as a single piece component 110 as shown in FIG. 3. One end 112 of the single piece component 110 would extend outwardly from the housing 12 and the opposite end 114 could be recessed with the breather bore 40, flush with the inner surface 44 of the housing wall 38, or extend beyond the inner surface 44 of the housing wall 38. The single piece component 110 includes a bore 116 that at least partially receives the resilient member 94. The resilient member 94 blocks fluid particles in the manner described above.

The subject breather 18 provides a unique configuration that provides several beneficial features. The breather 18 includes a large inner bore diameter in both the second extension end 76 and the second body end 36, which overcomes a capillary effect allowing fluid to drain to sump within the housing 12. Further, the large diameter prevents pumping of fluid out of the breather 18, especially at low temperatures when viscosity is high.

The crowned configuration at the distal tip 88 of the extension 70 breaks surface tension of fluid film and prevents fluid L from pumping out of the breather 18 under pressure. Also, at higher temperatures, the viscosity of the fluid L is lower and a splash leak mode is more prevalent. The crowned configuration limits an angle of trajectory of fluid particles toward the disc member 64. The limits are a function of the length of the extension 70 and the diameter of the extension bore 72. Longer extensions or smaller bore diameters decrease the angle of trajectory. To prevent pumping, i.e. to reduce the capillary effect, the extension should be as long as possible with an inner bore diameter that is as large as possible.

The disc member 64 and spring 66 within the cap 56 cooperate to prevent water and debris ingress as well as reducing oil misting and allowing positive and negative relative pressure equalization. The conical spring 96 inside the extension 70 catches splash particles and prevents fluid L from reaching the disc member 64. The discontinuous surface of the conical spring 96 reduces capillary action at the spring and allows fluid L to drain to sump. The conical spring 96 operates better than traditional mesh screens, which have a tendency to clog.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A breather for a driveline component comprising:
    a body having an internal bore with a first end adapted to extend outwardly from an axle housing and a second end adapted to extend into the axle housing, and wherein said body includes a threaded portion for engagement with a breather bore formed within the axle housing, said threaded portion being positioned between said first and second ends;
    an extension supported by said second end, said extension having a non-uniform cross-section and extending from a first extension end received within said internal bore of said second end of said body and a second extension end to extend beyond an inner surface of the axle housing, said extension portion including a plurality of removed areas separated from each other by a plurality of slats to form a crown;
    a coil spring supported by said extension wherein said coil spring and said extension cooperate to reduce an amount of lubricating fluid that enters said second end of said internal bore while allowing air to vent from said first end of said internal bore; and
    a spring loaded cap covering said first end of said internal bore of said body, said spring loaded cap being resiliently biased to close said first end during non-venting operation.

2. The breather according to claim 1 wherein said extension has an extension bore extending from said first extension end to said second extension end, said extension bore defined by at least a first diameter at said first extension end and a second diameter at said second extension end and wherein said second diameter is greater than said first diameter.

3. A breather for a driveline component comprising:
    a body having an internal bore with a first end adapted to extend outwardly from a driveline component housing and a second end adapted to extend into the driveline component housing;
    an extension supported by said second end, said extension having a non-uniform cross-section, and wherein said extension has a first portion received within said internal bore and a second portion extending outwardly from said body to a distal tip, and said extension having an extension bore extending through said first and said second portions, said extension bore defined by at least a first diameter at said first portion and a second diameter at said second portion with said second diameter being greater than said first diameter, and said second portion having at least one removed area extending from said distal tip in a direction toward said first portion, wherein said at least one removed area comprises a plurality of removed areas spaced circumferentially apart from each other about said second portion;
    a resilient member supported by said extension wherein said resilient member and said extension cooperate to reduce an amount of lubricating fluid that enters said second end of said internal bore while allowing air to vent from said first end of said internal bore; and
    wherein said body has a threaded outer diameter that is adapted for threaded engagement with a threaded bore formed within the driveline component housing, said threaded outer diameter defined by a minor thread diameter, and wherein said second diameter of said extension bore plus two times an extension wall thickness located at said second diameter is approximately equal to said minor thread diameter.

4. The breather according to claim 1 wherein said extension has an extension bore extending from said first extension end to said second extension end and wherein said coil spring is received within said extension bore to block lubricating fluid from entering said internal bore.

5. The breather according to claim 4 wherein said coil spring comprises a conical spring having a first spring end defining a first spring diameter and a second spring end defining a second spring diameter that is less than said first spring diameter.

6. The breather according to claim 5 wherein said first extension end of said extension includes a tapered surface that defines a spring seat, said first spring end being constrained between said spring seat and said body and said second spring end being unsupported.

7. An axle assembly comprising:
    an axle housing defining a housing cavity and including a breather bore extending through a housing wall, said housing wall having an external surface and an internal surface; and
    a breather having:
        a body portion with an internal bore extending from a first body end to a second body end wherein said first body end extends outwardly beyond said external surface of said housing wall and said second body end is received within said breather bore to attach said breather to said axle housing;
        an extension portion having a non-uniform cross-section and including an extension bore extending from a first extension end to a second extension end, said first extension end being received within said internal bore at said second body end and said second extension end extending into said housing cavity beyond said internal surface of said housing wall, and wherein said second extension end includes a plurality of removed areas separated from each other by a plurality of tapered slats to form a crown at said second extension end; and
        a spring received within said extension bore wherein said extension portion and said spring cooperate to reduce an amount of lubricating fluid from exiting said breather and to allow air to vent from said breather.

8. The axle assembly according to claim 7 wherein said spring comprises a conical spring having a first spring end defining a first spring diameter and a second spring end defining a second spring diameter that is less than said first spring diameter, and wherein said first extension end includes a tapered surface that defines a spring seat, said first spring end being constrained between said spring seat and said body portion and said second spring end being unsupported within said extension bore, and wherein portions of adjacent coils of said conical spring are spaced apart from each other to define a discontinuous surface that captures splashed particles of the lubricating fluid to prevent the splashed particles from exiting the body portion of the breather.

9. An axle assembly comprising:

an axle housing defining a housing cavity and including a breather bore extending through a housing wall, said housing wall having an external surface and an internal surface; and a breather having:

a body portion with an internal bore extending from a first body end to a second body end wherein said first body end extends outwardly beyond said external surface of said housing wall and said second body end is received within said breather bore to attach said breather to said axle housing;

an extension portion having a non-uniform cross-section and including an extension bore extending from a first extension end to a second extension end, said first extension end being received within said internal bore at said second body end and said second extension end extending into said housing cavity beyond said internal surface of said housing wall, and wherein said extension bore is defined by at least a first diameter at said first extension end and a second diameter at said second extension end that is greater than said first diameter, and wherein said body portion has a threaded outer diameter that is in threaded engagement with a threaded diameter of said breather bore, and wherein said second diameter plus two times an extension wall thickness located at said second diameter is approximately equal to a minor thread diameter of said threaded outer diameter; and a resilient member received within said extension bore wherein said extension portion and said resilient member cooperate to reduce an amount of lubricating fluid from exiting said breather and to allow air to vent from said breather.

10. A breather for a driveline component comprising:

a body member mounted to an axle housing and having an internal bore in fluid communication with a cavity formed within the axle housing; and wherein said body member includes a threaded portion for engagement with a breather bore formed within the axle housing, said threaded portion being positioned between first and second end of said body member;

an extension having a non-uniform cross-section and extending from a first extension end received within said internal bore of said second end of said body and a second extension end to extend beyond an inner surface of the axle housing, said extension portion including a plurality of removed areas separated from each other by a plurality of slats to form a crown; and a spring supported by said body member wherein said spring is positioned to reduce an amount of lubricating fluid from exiting the driveline component housing via said internal bore while allowing air to vent out of the cavity through said internal bore.

11. The breather according to claim 10 wherein said spring is at least partially received within said internal bore and wherein said spring comprises a discontinuous surface such that fluid particles that enter said internal bore contact said discontinuous surface and drain back into the cavity.

12. The breather according to claim 1 wherein said body and said extension are integrally formed together as a single-piece component.

13. The breather according to claim 1 wherein said body includes a ledge and said extension includes a tapered surface, said coil spring having a first spring end constrained between said ledge and said tapered surface and a second spring end that is unsupported.

14. The breather according to claim 13 wherein said coil spring comprises a conical spring with said first spring end having a greater diameter than said second spring end.

15. The breather according to claim 1 wherein the lubricating fluid at least partially fills the driveline component housing to lubricate the driveline component.

16. The breather according to claim 1 wherein said coil spring is positioned within said first portion with portions of adjacent coils being spaced apart from each other to define a discontinuous surface that captures splashed particles of the lubricating fluid.

17. The axle assembly according to claim 7 wherein the lubricating fluid at least partially fills said housing cavity, the lubricating fluid providing lubrication for a driveline component positioned within said housing cavity.

18. The breather according to claim 10 wherein said spring comprises a conical coil spring having a first spring end defined by a first diameter and a second spring end defined by a second diameter that is less than said first diameter, said first spring end being retained by a spring seat formed on said body member and said second spring end being unsupported, and wherein portions of adjacent coils of said conical coil spring are spaced apart from each other to define a discontinuous surface that captures splashed particles of the lubricating fluid to prevent the particles from exiting the axle housing via said internal bore.

19. The breather according to claim 10 wherein said body member includes a first portion to extend outwardly from an external surface of the axle housing, a second portion comprising said threaded portion to be fixed to the axle housing, and a third portion to extend inwardly from an internal surface of the axle housing, and wherein said spring includes at least one spring portion that is positioned within said second portion.

* * * * *

UNITED STATES PATENT AND TRADEMARK OFFICE
CERTIFICATE OF CORRECTION

PATENT NO. : 7,604,020 B2
APPLICATION NO. : 11/226012
DATED : October 20, 2009
INVENTOR(S) : Donald Michael Kennedy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this

Fifth Day of October, 2010

David J. Kappos
*Director of the United States Patent and Trademark Office*